United States Patent [19]

Gruber

[11] Patent Number: 5,309,529
[45] Date of Patent: May 3, 1994

[54] BEARING ARRANGEMENT FOR A RADIAL BEARING IN AN ACCELERATION-PROOF GYROSCOPE

[75] Inventor: Ernst Gruber, Munich, Fed. Rep. of Germany

[73] Assignee: Deutsche Aerospace AG, München, Fed. Rep. of Germany

[21] Appl. No.: 989,564

[22] Filed: Dec. 11, 1992

[30] Foreign Application Priority Data

Dec. 14, 1991 [DE] Fed. Rep. of Germany ....... 4141312

[51] Int. Cl.⁵ ............................................. F16C 39/00
[52] U.S. Cl. ................................... 384/536; 384/624; 384/906
[58] Field of Search ............... 384/536, 582, 906, 624, 384/537, 584

[56] References Cited

U.S. PATENT DOCUMENTS

| | | | |
|---|---|---|---|
| 4,708,498 | 11/1987 | Labedan et al. | 384/582 |
| 4,722,618 | 2/1988 | Matsumoto et al. | 384/536 |
| 5,044,785 | 9/1991 | Bair et al. | 384/536 |
| 5,172,985 | 12/1992 | Constancio | 384/582 |

Primary Examiner—Lenard A. Footland
Attorney, Agent, or Firm—Antonelli, Terry, Stout & Kraus

[57] ABSTRACT

A bearing arrangement for a bearing seat for a radial bearing adapted to be disposed in an acceleration-proof gyroscope, on which a brief acceleration produced forces act perpendicularly to a rotational axis of the gyroscope. The bearing seat includes a cylindrical half shell, with a longitudinal center axis of the cylinder of the half shell coinciding with a rotational axis of the radial bearing, and with an open side of the half shell facing in a direction in which the acceleration forces act on the radial bearing. An elastic element urges or biases a support ring into the half shell with a preset force, with the elastic element having a spring characteristic such that the support ring and the radial bearing may be lifted out of the half shell when a predetermined acceleration is exceeded.

6 Claims, 1 Drawing Sheet

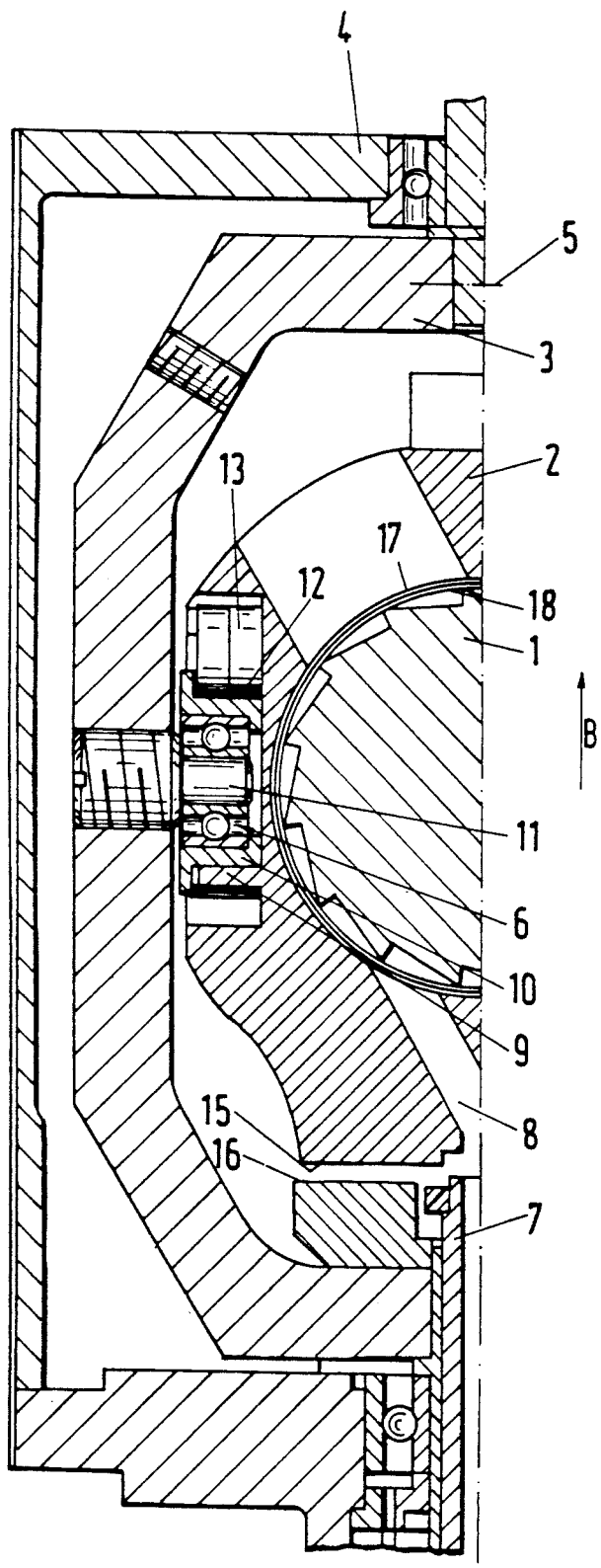
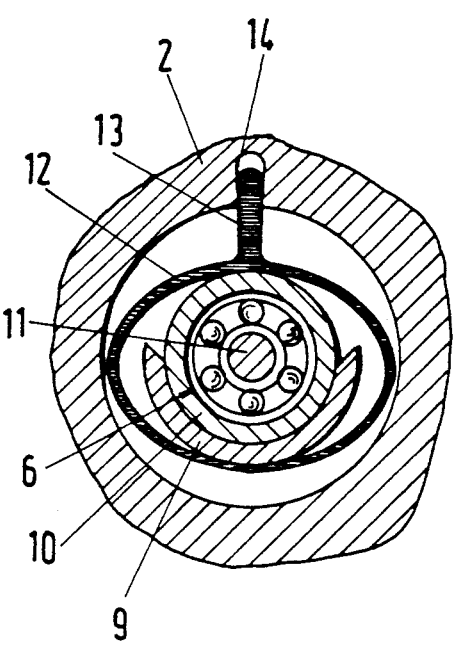
Fig.1
Fig.2

BEARING ARRANGEMENT FOR A RADIAL BEARING IN AN ACCELERATION-PROOF GYROSCOPE

FIELD OF THE INVENTION

The present invention relates to a bearing arrangement and, more particularly, to a bearing seat for a radial bearing in an acceleration-proof gyroscope subjected to acceleration-produced force acting perpendicularly to a rotational axis, with an elastic element radial acting on the radial bearing.

In, for example, DE 30 14 480 C1, a radial bearing is proposed which is elastically suspended on all sides, so that a mounted gyroscope rotor or a gyroscope frame is capable of deflecting laterally when subjected to the action of high acceleration forces, so that the accelerating forces cannot act directly on the sensitive bearing elements. As a result of an unavoidable spring hysteresis or residual acceleration forces or oscillations, for example, during a flight phase of a projectile equipped with a gyroscope of this type, the rotational axes of the gyroscope no longer occupy their original or initial resting positions, so that angular errors and, consequently, increased frictional torques occur in the gyroscope.

SUMMARY OF THE INVENTION

The aim underlying the present invention essentially resides in providing a bearing arrangement and, in particular, a bearing seat for a radial bearing in an acceleration-proof gyroscope especially for projectiles, which avoids, by simple means, the shortcomings and disadvantages encountered in the prior art.

In accordance with advantageous features of the present invention, a bearing arrangement is provided which includes a bearing seat for a radial bearing in an acceleration-proof gyroscope, on which a brief acceleration-caused force acts perpendicularly to the rotational axis, with an elastic element acting radially on the radial bearing. The radial bearing is surrounded by a support ring, with the radial bearing being axially insertable into the support ring. The bearing seat is shaped or fashioned of a cylindrically half shell, with a cylindrical axis of the half shell coinciding with the rotational axis of the radial bearing, and with an open side of the half shell facing a direction in which a force is exerted on the radial bearing due to acceleration. An elastic element urges the support ring into the half shell with a predetermined force and has a spring characteristic such that the support ring and radial bearing may be lifted off the half shell when a preset acceleration force is exceeded.

In accordance with further features of the present invention, the elastic element is fashioned as an oval annular spring surrounding the support ring and the half shell.

The annular spring may, in accordance with the present invention, include a rotation preventer for preventing rotation of the oval annular spring with respect to inner and outer gyroscopic frames of the gyroscope.

The present invention is based on the premise that, in order to achieve freedom from the influence of acceleration in a gyroscope, in many circumstances, especially in a firing phase of projectiles, only one acceleration direction needs to be considered. However, when a projectile is fired, especially from, for example, a gun, extremely high acceleration forces develop and, for example, the acceleration forces may exceed 10,000 g, so that the effective protection of the sensitive gyroscope rotor bearings and gimbal suspensions of the gyroscope frames are essential when the projectile is fired. Nevertheless, it can be appreciated that the cost effective protection must be maintained as low as possible.

According to the present invention, by virtue of the surrounding of the radial bearing by a support ring inside a half shell by an elastic element such as a spring, the bearing is caused, even after radial deflection of the bearing seat, to return exactly to an original or initial position and being maintained in the original or initial position by a specific force dictated by the spring characteristics of the elastic element. Additionally, the radial bearing is free to move axially with respect to the bearing seat, since the elastic element, i.e. spring, does not directly act on the bearing seat.

Moreover, by providing an oval annular spring as the elastic element, it is possible to produce high retaining forces as well as to provide a relatively long spring length with a small structural volume, so that spring breakage or failure caused by large acceleration forces is avoided.

BRIEF DESCRIPTION OF THE DRAWINGS

The above and other objects, features and advantages of the present invention will become more apparent from the following description when taken in connection with the accompanying drawings which show, for the purpose of illustration only, one embodiment in accordance with the present invention, and wherein:

FIG. 1 is a cross-sectional view through a half of a gyroscope provided with a bearing arrangement constructed in accordance with the present invention; and FIG. 2 is a radial sectional view through the bearing of the inner gyroscope frame of FIG. 1.

DETAILED DESCRIPTION OF THE PREFERRED EMBODIMENTS

Referring now to the drawings, wherein like reference numerals are used in both views to designate like parts and, more particularly, to FIG. 1, according to this figure, a position gyroscope constructed in accordance with the present invention includes a gyroscope rotor 1, an inner gyroscope frame 2, and an outer gyroscope frame 3. The outer gyroscope frame is rotatably mounted in a housing 4 with a rotational axis 5 simultaneously serving as a roll axis of, for example, a projectile (not shown).

When the projectile is fired, accelerating forces acting through the housing 4 and the outer gyroscope frame 3 on a radial bearing 6 of the inner gyroscope frame 2 and through the inner gyroscope frame on bearings (not shown) of the gyroscope rotor. The acceleration direction is indicated by the arrow B in FIG. 1. The inner gyroscope frame 2 is locked during the firing phase by a displaceable gas guidance tube 7, which is moved onto frame 2 so that a seal 7.1 comes in contact to a step shaped lip 8.1 of an inlet channel 8 through which a propellant gas flows into an inlet channel 8 of the inner gyroscope frame 2 to drive the gyroscope rotor 1. After a completion of the drive phase, the gas guide tube is retracted, releasing the inner gyroscope frame 2. The outer gyroscope frame 3 is during the hold predescribed phase, then freely rotatable about the rotational axis 5 together with the gas guidance tube 7 during the entire phase.

A bearing seat for radial bearing 6 of the inner gyroscope frame 2 includes a cylindrical half shell 9, shown most clearly in FIG. 2, connected to the inner gyroscope frame 2. A support ring 10 is embedded or mounted to precisely fit in the cylindrical half shell 9. The radial bearing 6 is axially insertable into the support ring 10. A bearing pin 11 threadably insertable in an inward direction by the outer gyroscope frame 3, is precisely fitted into the inner ring or race of the radial bearing 6.

Support ring 10 is urged or biased into the cylindrical half shell 9 by an oval annular spring 12, shown most clearly in FIG. 2, with the oval annular spring 12 surrounding both the support ring 10 and the cylindrical half shell 9. The oval annular spring 12 includes a pin 13 adapted to fit into a groove 14 of the inner gyroscope frame 2, with the pin 13 being displaceable in a longitudinal direction of the groove 14 and being adapted to prevent rotational movement of the oval annular spring member 12.

In the event of a major accelerating force acting externally through the housing 4, the bearing pin 11 exerts a force in the direction of the arrow B on the radial bearing 6. If the major accelerating force is sufficient to overcome the spring force of the oval annular spring 12, the radial bearing 6 and the support ring 10 are lifted off the cylindrical half shell 9. The resultant radial displacement of the inner gyroscope frame 2 and the outer gyroscope frame 3 is delimited or defined by two stop surfaces 15, 16. More particularly, when the stop surfaces 15, 16 are brought into abutment, respective displacement between the inner gyroscope frame 2 and the outer gyroscope frame 3 is prevented thereby relieving the radial bearing 6 of accelerating forces exceeding a predetermined limiting value. The surfaces 75, 76 then also can function as a friction bearing, When the accelerating forces decrease, the support ring 10 is urged, together with the radial bearing 6, by the oval annular spring 12 back into the bearing seat, so that the rotational axis of the radial bearing 6 again exactly assumes its original or initial position.

In the same manner as the inner gyroscope frame 2 is mounted on the outer gyroscope frame 3, the gyroscope rotor 1 can also be mounted on the inner gyroscope frame 2. Delimitation of the radial deflection at high acceleration then occurs through two parallel stop surfaces 17 on an inside of the inner gyroscope frame 2 and two parallel surfaces 18 on an outer circumference of the gyroscope rotor 1, corresponding to surfaces 17. The surfaces 17, 18 then also can function as friction bearings when brought into contacts.

I claim:

1. A bearing arrangement adapted to be subjected to brief acceleration forces acting perpendicularly to a rotational axis of the bearing arrangement, the bearing arrangement comprising:
    a radial bearing;
    a support ring surrounding the radial bearing, said radial bearing being axially insertable into said support ring;
    a bearing seat for accommodating said radial bearing, said bearing seat being fashioned as a cylindrical half shell having a cylindrical axis coinciding with a rotational axis of the radial bearing, an open side of said cylindrical half shell faces a direction in which the acceleration forces act upon the radial bearing; and
    an elastic element radially acting on the radial bearing and urging said support ring into the cylindrical half shell with a predetermined force, said elastic element having a spring characteristic such that the support ring and the radial bearing are lifted off the cylindrical half shell when a preset acceleration force is exceeded.

2. A bearing arrangement according to claim 1, wherein the bearing arrangement is arranged in an acceleration-proof gyroscope.

3. A bearing arrangement according to claim 1, wherein the elastic element is fashioned as an oval annular spring surrounding the support ring and the half shell.

4. A bearing arrangement according to claim 3, wherein the oval annular spring includes a rotation preventer for preventing rotation of the oval annular spring with respect to the bearing seat.

5. A bearing arrangement according to claim 4, wherein the bearing arrangement is arranged in an acceleration-proof gyroscope.

6. A bearing arrangement according to claim 5, wherein the acceleration-proof gyroscope is disposed in a projectile.

* * * * *